US009327647B2

(12) United States Patent
Milbank

(10) Patent No.: US 9,327,647 B2
(45) Date of Patent: May 3, 2016

(54) CLAMP FOR MOUNTING ON AN ARM WHICH IS CONNECTED TO A MIRROR ASSEMBLY

(71) Applicant: Milenco Limited, Buckinghamshire (GB)

(72) Inventor: Frederick Nigel Milbank, Buckinghamshire (GB)

(73) Assignee: Milenco Limited (GB)

( * ) Notice: Subject to any disclaimer, the term of this patent is extended or adjusted under 35 U.S.C. 154(b) by 0 days.

(21) Appl. No.: 14/497,000

(22) Filed: Sep. 25, 2014

(65) Prior Publication Data
US 2015/0098145 A1 Apr. 9, 2015

(30) Foreign Application Priority Data

Oct. 9, 2013 (GB) .................................... 1317833.0

(51) Int. Cl.
*G02B 7/182* (2006.01)
*B60R 1/00* (2006.01)
*F16B 2/12* (2006.01)
*B60R 1/078* (2006.01)
*F16B 2/06* (2006.01)

(52) U.S. Cl.
CPC ................. *B60R 1/006* (2013.01); *B60R 1/078* (2013.01); *F16B 2/065* (2013.01); *F16B 2/12* (2013.01); *G02B 7/182* (2013.01)

(58) Field of Classification Search
CPC ......... B60R 1/006; B60R 1/078; F16B 2/065; F16B 2/12; G02B 7/182
USPC .......... 359/871; 248/689, 466, 229.1, 229.12, 248/229.14, 229.15
See application file for complete search history.

(56) References Cited

U.S. PATENT DOCUMENTS

| 5,259,582 | A | * | 11/1993 | DeLange, III | ................. | 248/481 |
| 6,217,180 | B1 | * | 4/2001 | Eisenbraum | ................... | 359/871 |
| 6,679,612 | B1 | * | 1/2004 | West et al. | ..................... | 359/871 |
| 8,820,548 | B2 | * | 9/2014 | Wilson | ........................ | 211/133.6 |
| 2004/0001262 | A1 | * | 1/2004 | Spychalla et al. | ............. | 359/871 |
| 2008/0259477 | A1 | * | 10/2008 | Gorton et al. | .................. | 359/879 |
| 2010/0202072 | A1 | * | 8/2010 | Ferman et al. | ................. | 359/850 |
| 2011/0176235 | A1 | * | 7/2011 | Heger et al. | ..................... | 359/872 |
| 2013/0050861 | A1 | * | 2/2013 | Tsai et al. | ....................... | 359/871 |
| 2014/0085739 | A1 | * | 3/2014 | Bohanan et al. | .............. | 359/841 |

FOREIGN PATENT DOCUMENTS

| DE | 202012008084 | 10/2012 |
| DE | 202012104560 | 12/2012 |
| EP | 0437695 | 7/1991 |
| GB | 2444919 | 6/2008 |
| JP | 2002374109 | 3/1987 |

* cited by examiner

*Primary Examiner* — Frank Font
(74) *Attorney, Agent, or Firm* — Bryant J. Keller; Kirton McConkie, P.C.

(57) ABSTRACT

A clamp is for mounting on an arm. The clamp comprises a frame, a gripping element and a moveable clamping member. The frame comprises an upright portion and a lip located at a lower end of the upright portion and extending substantially perpendicularly to the upright portion. The gripping element is connected to the frame, and is arranged to mount on the arm, and comprises a first component and a second component connected together at one end and spaced apart at the other end, the arm to be located between the first component and a second component in a hole. The moveable clamping member is mounted through a hole in the second component, and comprises a shaft and an engaging portion arranged to be moved towards the lip of the frame.

20 Claims, 6 Drawing Sheets

CLAMP FOR MOUNTING ON AN ARM WHICH IS CONNECTED TO A MIRROR ASSEMBLY

Figure 1:
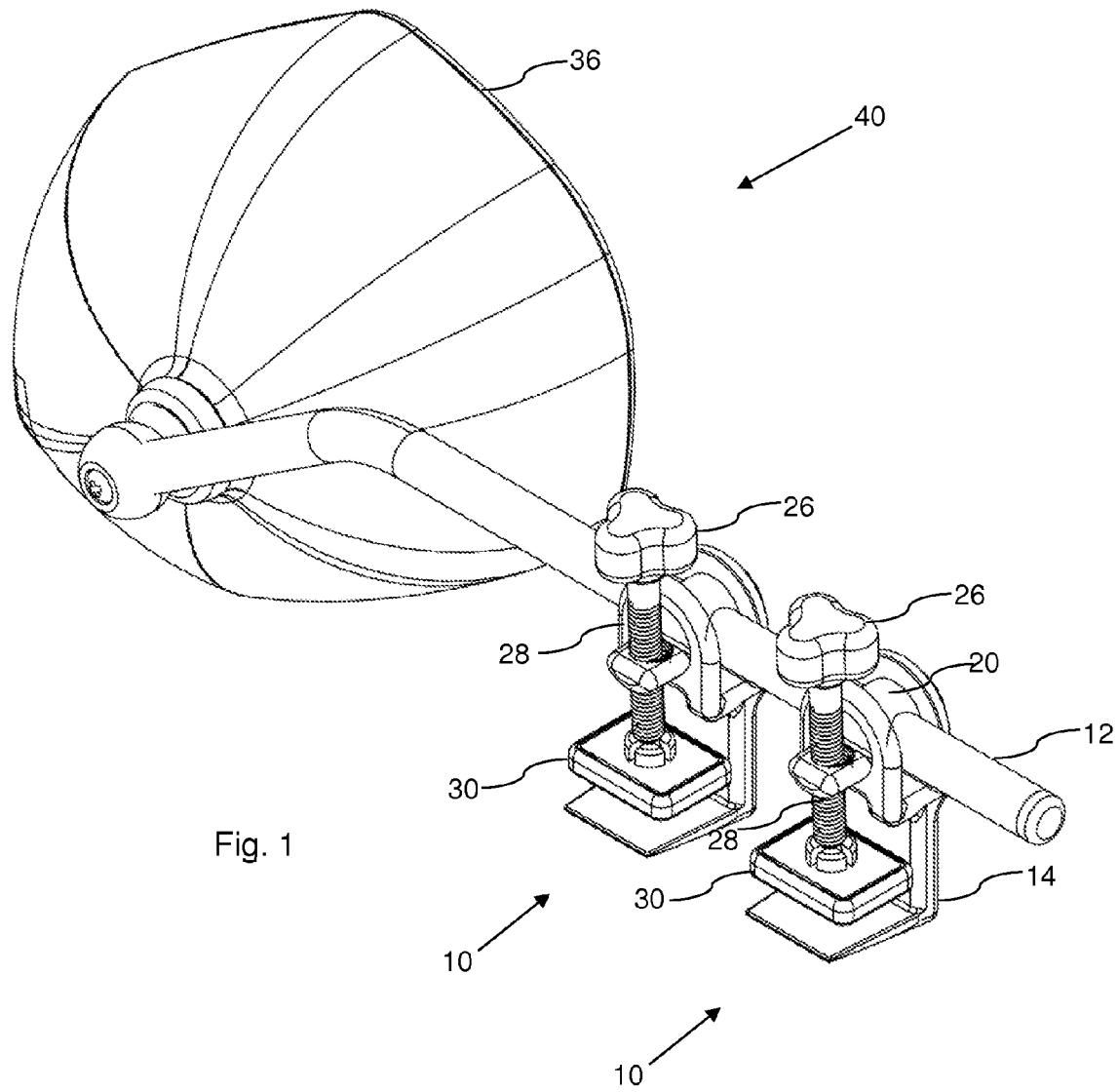

This invention relates to a clamp. The invention also relates to apparatus including a mirror assembly and the clamp. Such apparatus can be used by vehicle drivers, for example when the driver is towing a wide load and needs an extension to their conventional wing mirror.

If a vehicle driver is towing a wide load, such as a car with a caravan, then it is advantageous, and in some jurisdictions a legal requirement, that the conventional vehicle wing mirror be extended, in order for the vehicle driver to be able to see behind and along the side of the wide load. To achieve this, it is known to provide apparatus, sometimes referred to as a towing mirror, which includes a mirror and a device for fixing that mirror to the conventional wing mirror. However, as vehicle design becomes more complicated and elaborate, there is a difficulty in providing a towing mirror that will fit all, or at least the vast majority, of wing mirror designs.

United Kingdom Patent GB 2444919 discloses a mirror assembly with a clamp. The apparatus comprises a mirror assembly, an arm connected to the mirror assembly, and at least one bracket mounted on the arm, the bracket comprising a clamp for connecting to a vehicle wing mirror, where the clamp is rotatable about an axis substantially perpendicular to the arm. This design of towing mirror provides a more flexible solution to the problem of fixing the towing mirror to modern curved vehicle wing mirrors. The rotation of the clamps allow them to be positioned to match the curvature of the wing mirror. However, the clamps of this wing mirror have two adjustable elements that are used to fix the clamps in position.

It is therefore an object of the invention to improve upon the known art.

According to the present invention, there is provided a clamp for mounting on an arm, the clamp comprising a frame comprising an upright portion and a lip located at a lower end of the upright portion and extending substantially perpendicularly to the upright portion, a gripping element connected to the frame and arranged to mount on the arm, and comprising a first component and a second component connected together at one end and spaced apart at the other end, the arm to be located between the first component and the second component, and a moveable clamping member, mounted through a hole in the second component, and comprising a shaft and an engaging portion arranged to be moved towards the lip of the frame.

Owing to the invention, it is possible to provide a clamp that can be used in a towing mirror system that has only a single adjustable element, which makes the clamp much easier for a user to fix into position and also simplifies the manufacturing process for the clamp. The moveable clamping member, which is essentially to fix the clamp to the vehicle wing mirror, also performs the function of fixing the clamp to the arm of the towing mirror (which in the prior art towing mirror required a second element to perform this fixing). As the moveable clamping member is tightened onto the vehicle wing mirror, the two halves of the gripping element (the first and second components) are forced together, thereby gripping onto the arm of the towing mirror.

Preferably, the upright portion of the frame is provided with a hole through which the gripping element is located and the gripping element can rotate in the hole relative to the upright portion of the frame. In a preferred embodiment of the invention, the upright portion of the frame of the clamp is provided with a hole through which the gripping element is located. The gripping element can rotate in this hole and this increases the flexibility of the clamps when they are fitted since the frame of the clamp can be rotated at an angle to the moveable clamping member. When the clamp is fitted to a vehicle wing mirror, this allows the rotation to be used to compensate for any curvature in the external surface of the wing mirror, as is common on modern vehicle wing mirrors.

Embodiments of the present invention will now be described, by way of example only, with reference to the accompanying drawings, in which:—

Figure 2:
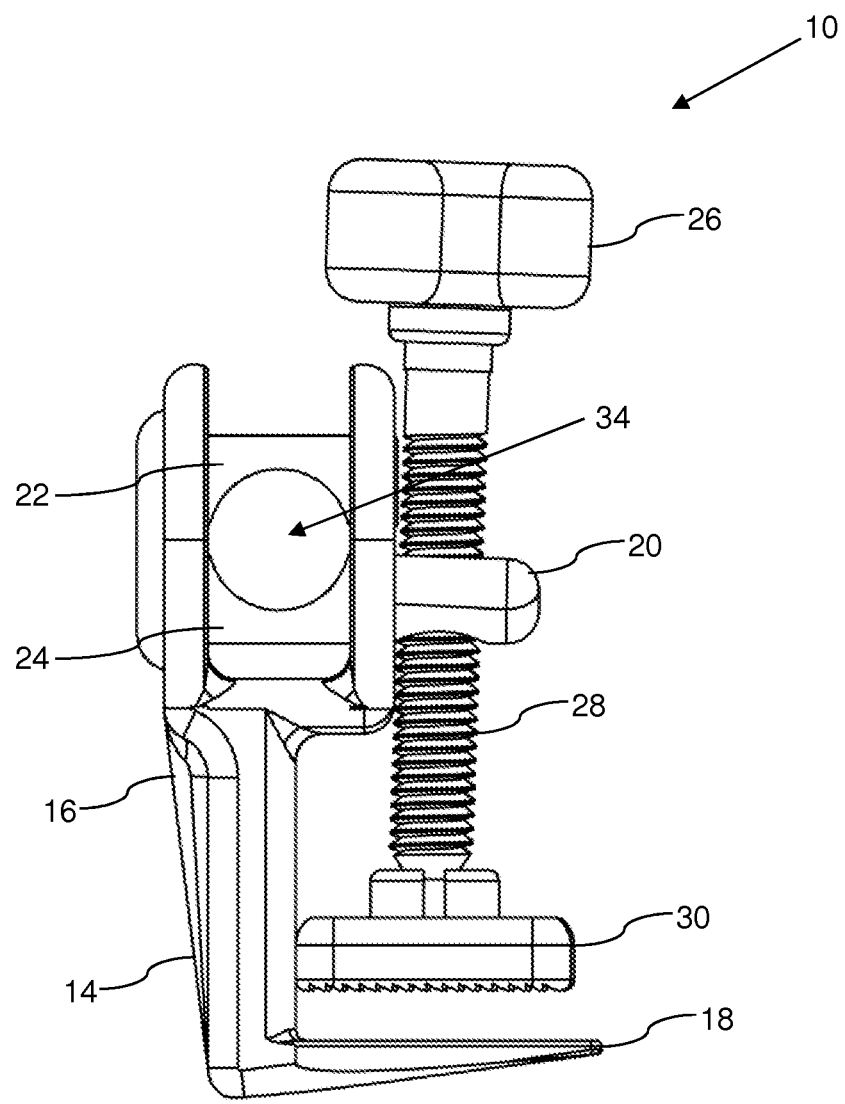
Figure 3:
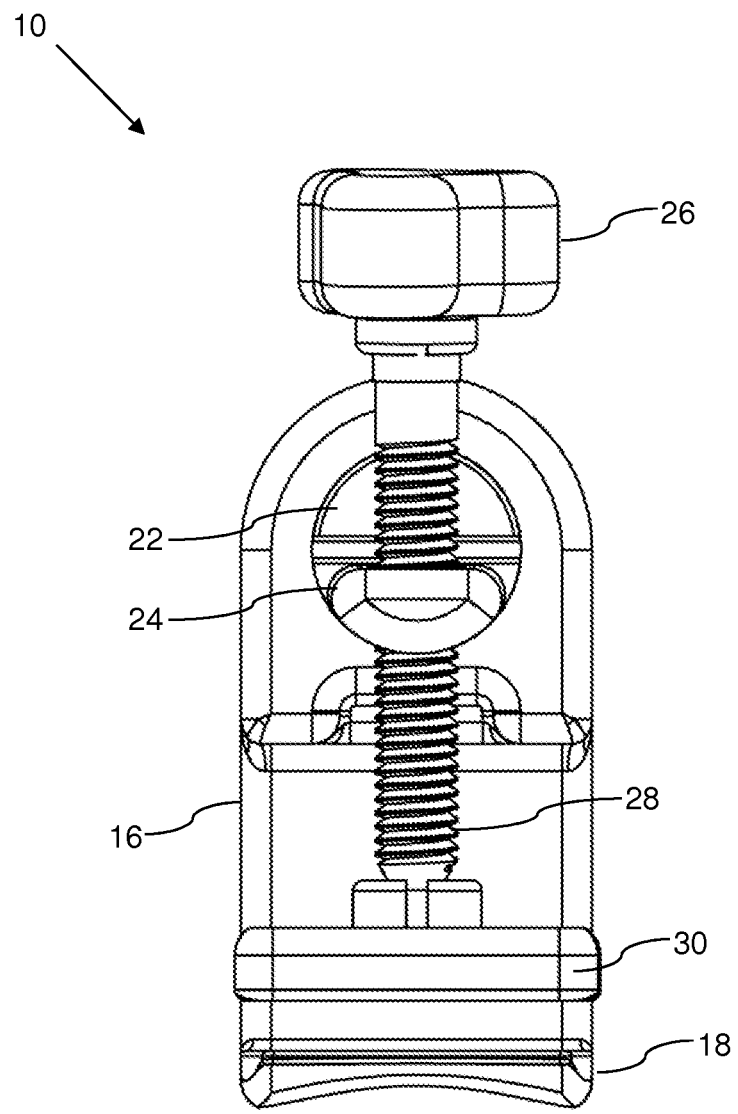
Figure 4:
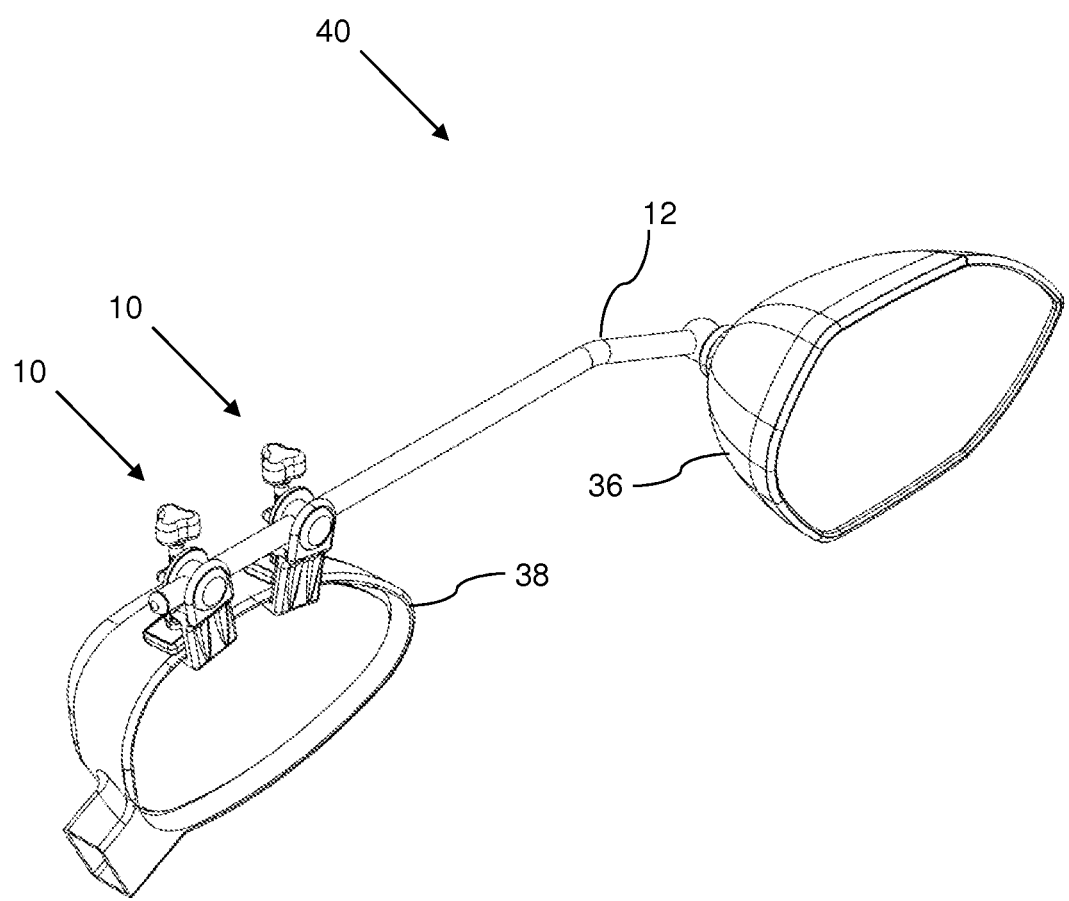
Figure 5:
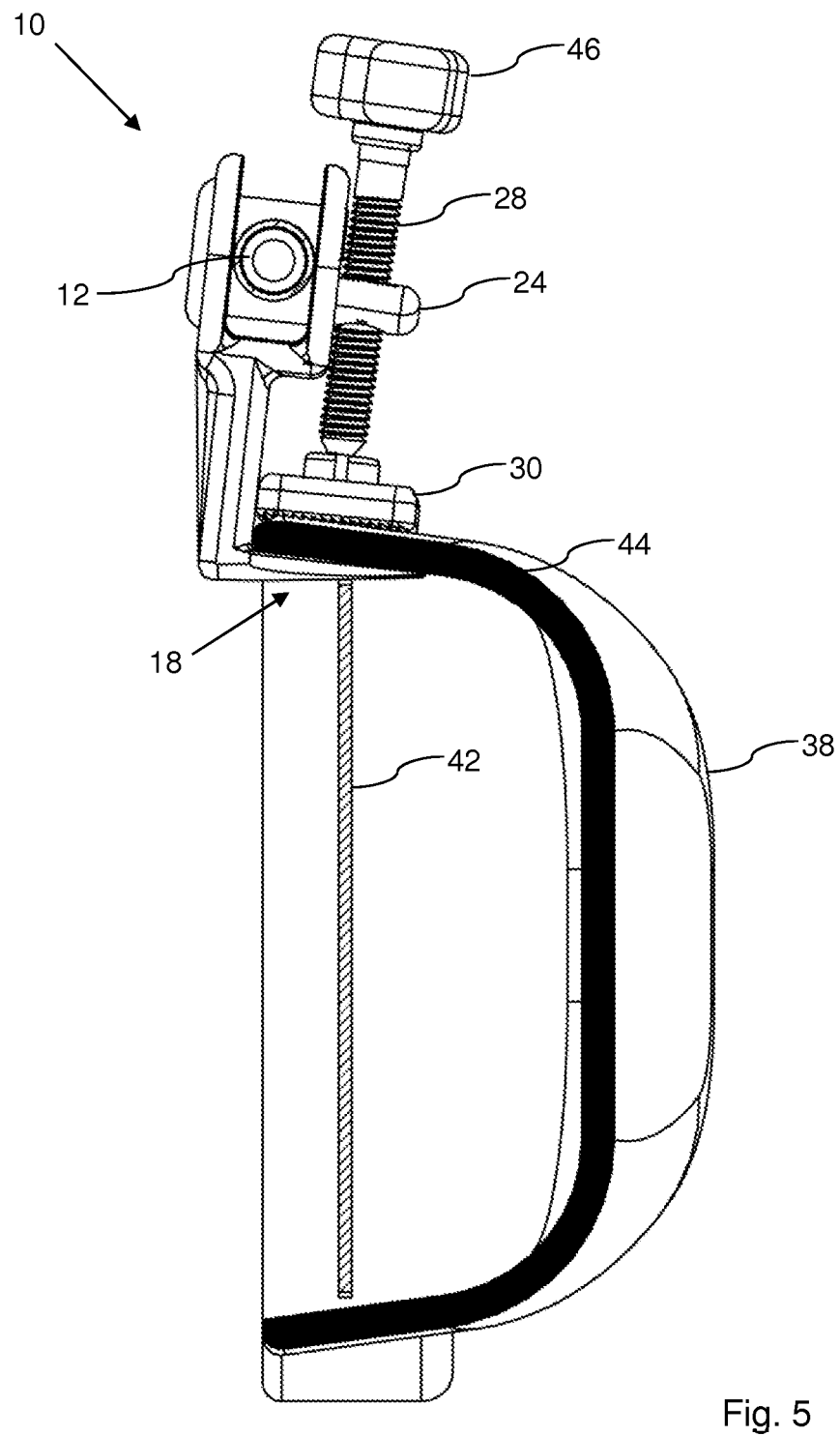
Figure 6:
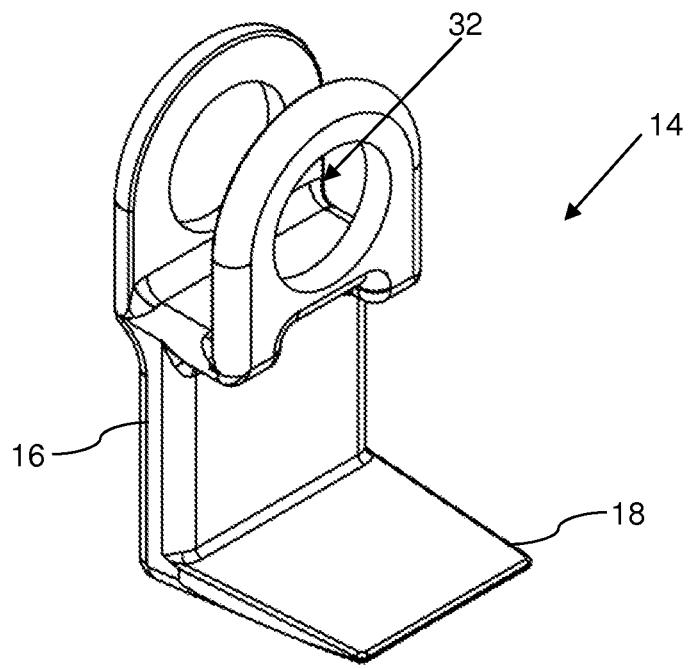
Figure 7:
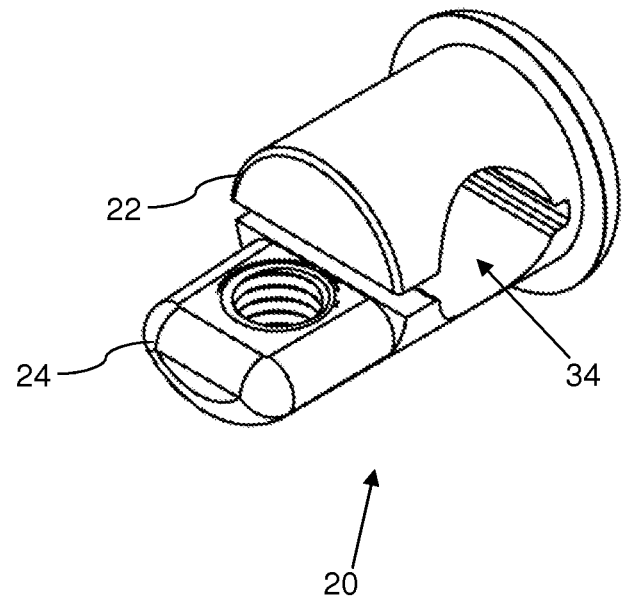

FIG. 1 is a perspective view of a towing mirror,
FIG. 2 is a side view of a clamp,
FIG. 3 is a front view of the clamp,
FIG. 4 is a perspective view of the towing mirror fixed to a wing mirror,
FIG. 5 is a section through the wing mirror of FIG. 4,
FIG. 6 is a perspective view of a frame of the clamp, and
FIG. 7 is a perspective view of a gripping element of the clamp.

FIG. 1 shows a towing mirror 40, which comprises a mirror assembly 36, an arm 12 connected to the mirror assembly 36, and a pair of clamps 10. The towing mirror 40 is shown as being provided with two clamps 10, but could be fitted with a single clamp 10 and would still be usable, although two clamps 10 clearly provide a more stable connection. The towing mirror 40 is designed to be fitted to a vehicle wing mirror, using the clamps 10. Each clamp 10 is provided with a moveable clamping member 26, which can be raised and lowered in order to clamp each individual clamp 10 onto the wing mirror. Each moveable clamping member 26 comprises a shaft 28 and an engaging portion 30.

The clamp 10 is comprised of three principal components, of which the moveable clamping member 26 is one. The other two main components are a frame 14 and a gripping element 20 (see FIG. 2). The frame 14 comprises an upright portion 16 and a lip 18 located at a lower end of the upright portion 16 and extending substantially perpendicularly to the upright portion 16. The gripping element 20 is connected to the frame 14 and is arranged to mount on the arm 12, and comprises a first component 22 and a second component 24 (also shown in more detail in FIG. 2) that are connected together at one end and spaced apart at the other end, the arm 12 being located between the first component 22 and the second component 24.

FIGS. 2 and 3 show the clamp 10 in more detail. FIG. 2 is a side view of the clamp 10 and FIG. 3 is a front view of the clamp 10. The clamp 10 is for mounting on the arm 12. The clamp 10 comprises a frame 14, a gripping element 20 connected to the frame 14 and a moveable clamping member 26 which is mounted through a hole in the gripping element 20. The frame 14 comprises an upright portion 16 and a lip 18 located at a lower end of the upright portion 16 and extending substantially perpendicularly to the upright portion 16. The lip 18 is curved on its underside, in order to make it easier for the clamp 10 to be fixed into position on a curved vehicle wing mirror.

The gripping element 20 is connected to the frame 14 and is arranged to mount on the arm 12, and comprises a first component 22 and a second component 24 connected together at one end and spaced apart at the other end, the arm 12 to be located between the first component 22 and the second component 24. The first component 22 and the second component 24 are shaped to define a hole 34, through which the arm 12 is to be located. The moveable clamping member 26 is mounted through a hole in the second component 24, and comprises a shaft 28 and an engaging portion 30 arranged to be moved towards the lip 18 of the frame 14. The engaging portion 30 of the moveable clamping member 26 is loosely mounted on the shaft 28 and can rotate relative to the shaft 28.

FIGS. 4 and 5 show the towing mirror 40 fixed in position on a curved vehicle wing mirror 38. FIG. 4 shows a perspective view from above of the towing mirror fixed onto the wing mirror 38 using two clamps 10 and FIG. 5 shows a cross-section through the wing mirror 38 at a point close to the fixing of one of the clamps 10. Each clamp 10 is located on the wing mirror 38 such that the lip 18 of the frame 14 passes between the mirror 42 and edge 44 of the wing mirror 38. Once each clamp 10 has been located into position by the user, then the user will turn the knob 46 to rotate the shaft 28. The shaft 28 has a screw thread thereon, and the engaging portion 30 can be raised or lowered by rotation of the shaft 28.

The principal advantage of the clamp 10 is that only a single fixing element is needed to fix the clamp 10 both to the wing mirror 38 and to the arm 12. As the user turns the knob 46 to lower the engaging portion 30 of the moveable clamping member 26, relative movement occurs between the shaft 28 and the second component 24 (which mounts the shaft 28). At first, this relative movement will cause the engaging portion 30 to be lowered to engage the outer part of the wing mirror 38. However, once the engaging portion 30 has reached the full extent of its movement, as the user continues to turn the knob 46, the relative movement between the shaft 28 and the second component 24 will force the second component 24 upwards, clamping the arm 12. Therefore the user's single action of turning the knob 46 will firstly clamp the clamp 10 to the wing mirror 38 and secondly clamp the clamp 10 to the arm 12. In the view of FIG. 5 the engaging portion 30 is in contact with the wing mirror 38, and at this point if the user were to continue to turn the knob 46 in a clockwise direction then the second component 24 would be moved upwards by this rotation, tightening onto the arm 12.

FIG. 6 shows a perspective view of a component of the clamp 10, being the frame 14. The upright portion 16 of the frame 14 is provided with a hole 32 through which the gripping element 20, shown in FIG. 7, is located. The gripping element 20 can rotate in the hole 32 relative to the upright portion 16 of the frame 14. This rotation allows the clamp 10 to be rotated to match the curvature of the wing mirror 38, as can be seen in FIG. 4, for example. The lip 18 of the frame 14 is also curved on the underside in order to allow the lip 18 to slide in-between the mirror 42 and the edge 44 of wing mirror 38.

The gripping element 20 can be seen clearly in FIG. 7. The gripping element 20 comprises the first component 22 and the second component 24 connected together at one end and spaced apart at the other end, the arm 12 to be located between the first component 22 and the second component 24. The first component 22 and the second component 24 are shaped to define a hole 34, through which the arm 12 is to be located, where the cross-section of the hole 34 substantially matches the cross-section of the arm 12. The second component 24 of the gripping element 20 is longer than the first component 22 of the gripping element 20 and the shaft 28 of the moveable clamping member 26 does not pass through the first component 22 of the gripping element 20.

The invention claimed is:

1. A clamp for mounting on an arm, the clamp comprising:
   a frame comprising an upright portion and a lip located at a lower end of the upright portion and extending substantially perpendicularly to the upright portion,
   a gripping element connected to the frame and arranged to mount on the arm, and comprising a first component and a second component connected together at a first end and spaced apart a second end, the arm to be locatable between the first component and the second component, and
   a moveable clamping member, mounted through a first hole in the second component, and comprising a shaft and an engaging portion arranged to be movable towards the lip of the frame.

2. The clamp according to claim 1, wherein the shaft of the moveable clamping member has a screw thread thereon, and wherein the engaging portion is configured to be at least one of raised and lowered by rotation of the shaft.

3. The clamp according to claim 2, wherein the upright portion of the frame is provided with a second hole through which the gripping element is located.

4. The clamp according to claim 2, wherein the first component and the second component are shaped to define a third hole that is configured to receive.

5. The clamp according to claim 2, wherein the second component of the gripping element is longer than the first component of the gripping element and the shaft of the moveable clamping member does not pass through the first component of the gripping element.

6. The clamp according to claim 1, wherein the upright portion of the frame is provided with a second hole through which the gripping element is located.

7. The clamp according to claim 6, wherein the gripping element is rotatable in the first hole relative to the upright portion of the frame.

8. The clamp according to claim 7, wherein the first component and the second component are shaped to define a third hole that is configured to receive.

9. The clamp according to claim 7, wherein the second component of the gripping element is longer than the first component of the gripping element and the shaft of the moveable clamping member does not pass through the first component of the gripping element.

10. The clamp according to claim 6, wherein the first component and the second component are shaped to define a third hole that is configured to receive.

11. The clamp according to claim 6, wherein the second component of the gripping element is longer than the first component of the gripping element and the shaft of the moveable clamping member does not pass through the first component of the gripping element.

12. The clamp according to claim 1, wherein the first component and the second component are shaped to define a third hole that is configured to receive the arm.

13. The clamp according to claim 12, wherein a cross-section of the third hole substantially matches a cross-section of the arm.

14. The clamp according to claim 13, wherein the second component of the gripping element is longer than the first component of the gripping element and the shaft of the moveable clamping member does not pass through the first component of the gripping element.

15. The clamp according to claim 1, wherein the second component of the gripping element is longer than the first component of the gripping element and the shaft of the moveable clamping member does not pass through the first component of the gripping element.

16. The clamp according to claim 15, wherein the engaging portion of the moveable clamping member is loosely mounted on the shaft and is rotatable relative to the shaft.

17. The clamp according to claim 1, wherein the engaging portion of the moveable clamping member is loosely mounted on the shaft and is rotatable relative to the shaft.

18. An apparatus comprising:
a mirror assembly;
an arm connected to the mirror assembly; and
a first clamp mounted on the arm, the first clamp comprising:
- a frame comprising an upright portion and a lip located at a lower end of the upright portion and extending substantially perpendicularly to the upright portion;
- a gripping element connected to the frame and arranged to mount on the arm, and comprising a first component and a second component connected together at a first end and spaced apart at a second end, the arm to be locatable between the first component and the second component, and
- a moveable clamping member, mounted through a first hole in the second component, and comprising a shaft and an engaging portion arranged to be movable towards the lip of the frame.

19. The apparatus according to claim 18, and further comprising a second clamp mounted on the arm.

20. The apparatus according to claim 18, wherein the second component of the gripping element is longer than the first component of the gripping element and the shaft of the moveable clamping member does not pass through the first component of the gripping element.

* * * * *